United States Patent [19]

Le Dantec

[11] Patent Number: 4,867,941

[45] Date of Patent: Sep. 19, 1989

[54] PROCESS FOR CLEANING A GUIDE TUBE FOR A MEANS OF MEASURING THE NEUTRON FLUX IN A PRESSURIZED-WATER COOLED NUCLEAR REACTOR

[75] Inventor: Olivier Le Dantec, Lyon, France

[73] Assignee: Framatome, Courbevoie, France

[21] Appl. No.: 206,445

[22] Filed: Jun. 14, 1988

[30] Foreign Application Priority Data

Jun. 17, 1987 [FR] France .................. 87 08478

[51] Int. Cl.$^4$ .................. G21C 19/20; G21C 17/10
[52] U.S. Cl. .................. 376/316
[58] Field of Search .................. 376/316, 310, 254, 260

[56] References Cited

U.S. PATENT DOCUMENTS

| | | | |
|---|---|---|---|
| 4,610,838 | 9/1986 | Gasparro et al. | 376/310 |
| 4,720,369 | 1/1988 | Cadaureille et al. | 376/310 |
| 4,790,976 | 12/1988 | Zahn et al. | 376/316 |

FOREIGN PATENT DOCUMENTS 0185561 6/1986 European Pat. Off.

Primary Examiner—Brooks H. Hunt
Assistant Examiner—Daniel Wasil
Attorney, Agent, or Firm—Pollock, Vande Sande & Priddy

[57] ABSTRACT

The process involves injecting water into the guide tube (6) from the instrumentation room (10) and generating suction within the guide conduit (8) from the outlet end of this conduit located level with the upper face of the core support plate (5). The suction rate Q2 is higher than the injection rate Q1, the ration of these rates being at least equal to the ratio between the inlet cross-section of the guide conduit (8) and the inner cross-section of the entry sleeve (7) of the guide tube (6). The cleaning device comprises a bell (34) in which the suction is generated and which comes to bear on the upper surface of the support plate (5) via a gasket (35).

5 Claims, 3 Drawing Sheets

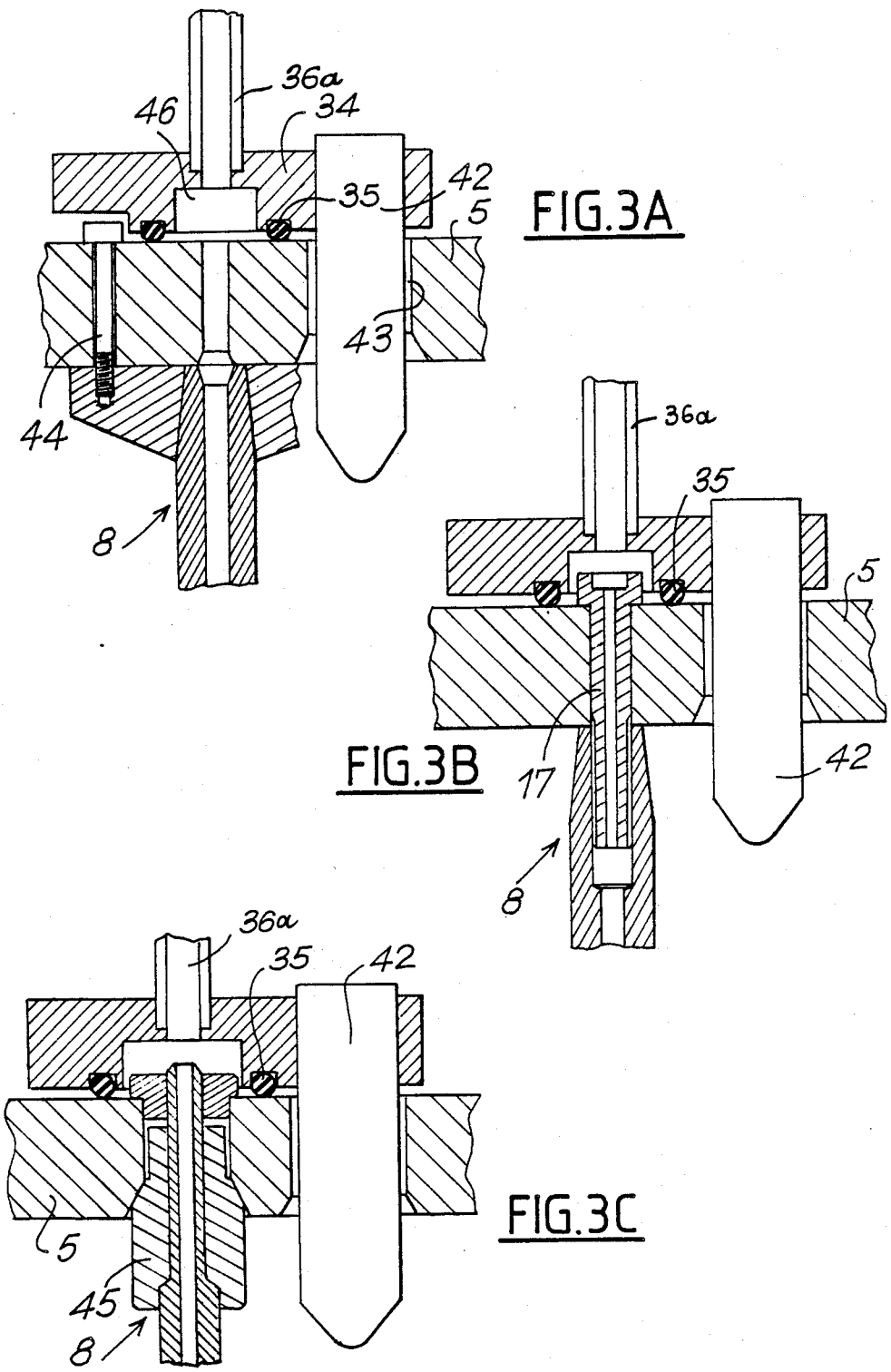

4,867,941

PROCESS FOR CLEANING A GUIDE TUBE FOR A MEANS OF MEASURING THE NEUTRON FLUX IN A PRESSURIZED-WATER COOLED NUCLEAR REACTOR

FIELD OF THE INVENTION

The invention relates to a process and a device for cleaning a guide tube for a means of measuring the neutron flux in a pressurized-water nuclear reactor.

BACKGROUND OF THE INVENTION

Pressurized-water nuclear reactors have a core consisting of prism-shaped fuel assemblies arranged vertically and resting on a support plate within the vessel of the nuclear reactor.

During the operation of the nuclear reactor, flux measurements have to be carried out periodically inside the core itself. For this purpose, fission detectors of very small size are used, and these are moved by remote control, by means of teleflex cables, inside tubes closed at one of their ends, called glove fingers. The glove fingers are introduced according to a predetermined distribution over the entire height of some of the fuel assemblies of the core, after passing within instrumentation tubes. By moving the flux detectors within the glove fingers introduced into the fuel assemblies, flux measurements can be made over the entire height of the core. It must be possible to extract the glove fingers from the fuel assemblies of the core, for example in order to make it possible to conduct the operations of refuelling the reactor core; for this purpose, a pull is exerted on the end of the glove fingers from an instrumentation room arranged laterally relative to the reactor vessel well. The glove fingers are arranged in guide tubes, one of the ends of which opens into the instrumentation room and the other end of which opens into the inner volume of the vessel by way of a vertical sleeve leading through the vessel bottom, this vessel bottom being of rounded shape. The guide tube has at least one bent portion between its two ends.

The lower internal equipment of the reactor comprises, in addition to the core support plate on which the fuel assemblies rest, the shroud and partitioning of the core and a set of elements arranged between the core support plate and the lower rounded bottom of the vessel, and comprising, in particular, instrumentation guide columns, each delimiting a central guide conduit in the extension of the inner bore of the corresponding lead-through sleeve. The end of each of the lead-through sleeves is engaged in the inlet end of the corresponding guide conduit with a relatively large radial play which makes it easier to install the lower internal equipment and match each of the lead-through sleeves to the corresponding guide conduit.

The inside diameter of the tubes, guide conduits and fuel-assembly instrumentation tubes is such that sufficient play remains between the glove finger and its guide conduit. The glove fingers can therefore be maneuvered easily by pulling and pushing, in order respectively to extract them from the core over the entire height of the latter, i.e., over a length of about four meters and in order to reintroduce them into the core.

However, it was found that, after a certain reactor operating time, the force required to extract the glove fingers and, above all, the force needed to reintroduce them increased substantially. For instance, the insertion force of the glove fingers which, for example, can be 100 to 150 Newtons at the time of commissioning of a reactor can, in this case, increase to a value of 400 to 500 Newtons after the second refuelling. This increase in the insertion force of the glove fingers was found to be attributable to the presence of solid particles settling between the glove finger and the inner wall of the guide tube, especially near the bends of this guide tube. In fact, the glove fingers, during their movement, cause an accumulation of particles in the region of the bends and assist their consolidation.

A process for cleaning the guide tubes at the time of the operations to refuel the reactor core was therefore proposed. At this time, the vessel is open in its upper part and is in communication with the reactor pool, the assembly as a whole being filled with water. To carry out the cleaning process, means were provided for injecting demineralized water under pressure into the guide tubes at their end opening into the instrumentation room.

However, this demineralized water and the particles which it contains in suspension have to be recovered at the other end of the guide tubes, in order to prevent radioactive particles from falling to the bottom of the water-filled vessel.

It is therefore necessary to recover the demineralized water at the outlet of the lead-through sleeves. To gain access to these sleeves, it is customary to dismantle the lower internal equipment which is extracted from the vessel, the upper internal equipment and the core assemblies having been extracted previously.

Means for recovering the water and the radioactive particles are fitted in succession on the end of each of the sleeves during the injection of pressurized water into the corresponding guide tube.

These means are installed from the platform of the fuelling machine above the reactor pool by means of a pole of very great length which, in its lower part, carries a camera making it possible to display the operations of installing the recovery means. These means comprise a cylindrical cap equipped on the inside with a gasket of a diameter corresponding to the diameter of the sleeve, a flexible hose which communicates with the inner volume of the cylindrical cap and on which is arranged a valve controlled from the platform by means of a control linkage, and a filtration unit at which the flexible hose terminates above the level of the pool.

These operations are difficult to carry out, and it is not possible to monitor them under very good conditions by means of a camera fixed to the lower end of the pole.

On the other hand, in order to carry out this process, it is necessary to extract the lower internal equipment from the vessel and consequently reinstall it after the operation. Both the extraction operation and the operation of reinstalling the lower internal equipment present considerable risks and increase the time required to carry out the maintenance of the reactor at shutdown.

Applicant's French Patent Application No. 2,573,236 relates to a device for cleaning the guide tubes of a nuclear reactor, which can be used without dismantling the lower internal equipment.

Such a device comprises, in particular, a rigid tube of small diameter and of great length, called a needle, which is introduced into the upper end of the sleeve of the tube to be cleaned, after it has passed through the lower internal equipment, by way of the corresponding guide conduit.

Such a device, which must be maneuvered by remote control, is relatively complex and must include monitoring and display means making it possible to ensure centering and perfect positioning of the end of the needle in the sleeve.

Furthermore, the time devoted to installing the device increases proportionately the time devoted to the cleaning of the guide tubes. In nuclear reactors in service at the present time, there are fifty guide tubes passing through the rounded bottom of the vessel by way of fifty sleeves distributed uniformly over this rounded bottom, and the repetition of the installation operations risks greatly increasing the total time devoted to the cleaning of the guide tubes.

In all cases, the water laden with radioactive particles which is recovered at the outlet of the sleeve is sucked up by a pumping device and conveyed to a filtration and decontamination apparatus.

SUMMARY OF THE INVENTION

The object of the invention is, therefore, to provide a process for cleaning a guide tube for a means of measuring the neutron flux in a pressurized-water reactor at shutdown, the said reactor comprising a vessel containing internal equipment for supporting and retaining the fuel assemblies of the core, or lower internal equipment, arranged above the rounded vessel bottom and comprising, in particular, a horizontal core support plate, a pool communicating with the inner volume of the vessel, the assembly as a whole being filled with water, a building containing the pool and the vessel within a vessel well, and an instrumentation room which is arranged laterally relative to the vessel well and into which penetrates one of the ends of each of the guide tubes which, over a path having at least one bend, connect the instrumentation room to the inner volume of the vessel, into which the guide tube opens via a vertical sleeve leading through the vessel bottom and engaged, with a certain radial play, into the inlet end of a guide conduit of the measuring means, formed in the lower internal equipment and opening out on the upper face of the core support plate, level with an entry position of the means of measuring the flux in a fuel assembly, the process involves injecting water into the guide tube from the instrumentation room and generating suction within the guide conduit of the measuring means, without dismantling the lower internal equipment and without needing to use complex devices.

To achieve this, the suction is generated in the guide conduit from the outlet end of this guide conduit located level with the upper face of the core support plate, with a suction rate Q2 higher than the injection rate Q1, the ratio of the suction rate Q2 to the injection rate Q1 being at least equal to the ration between the inlet cross-section of the guide conduit, into which the lead-through sleeve engages, and the inner crosssection of the sleeve.

BRIEF DESCRIPTION OF THE DRAWINGS

In order that the invention may be more clearly understood, an embodiment of the process according to the invention and a device for carrying out this process will now be described by way of example, with reference to the accompanying drawings.

FIGS. 3a, 3b and 3c are views in vertical section of part of the device making it possible to carry out the process according to the invention, according to three different embodiments.

DESCRIPTION OF PREFERRED EMBODIMENT

Figure 1:
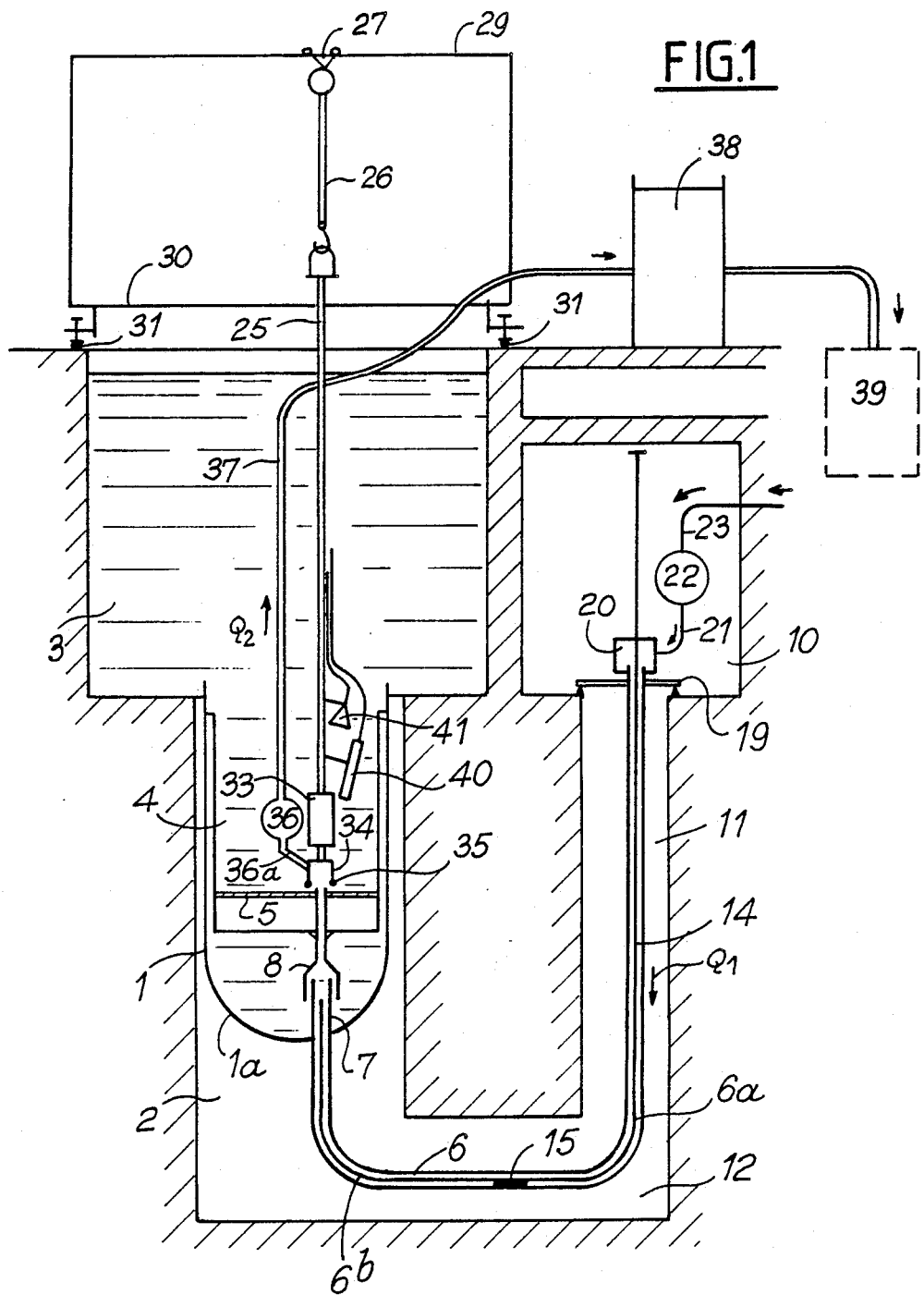
FIG. 1 is a diagrammatic vertical section view of a nuclear reactor during the execution of the cleaning process according to the invention.

FIG. 1 shows the vessel 1 of a pressurized water nuclear reactor, arranged inside a vessel well 2 formed within the concrete structure of the reactor building. Above the well 2 there is a pool 3 which forms the pool of the reactor.

In FIG. 1, the vessel 1 of the reactor is shown during a reactor maintenance phase, in which various repair and servicing operations and, in particular, the cleaning of the instrumentation guide tubes are carried out. During this maintenance phase, the upper cover of the vessel is removed, and the assembly consisting of the pool 3 and of the vessel 1 is filled with water.

The upper internal equipment of the reactor and the fuel assemblies of the core have been extracted from the vessel 1, which still contains the lower internal equipment 4. This lower internal equipment 4 comprises, in particular, the core support plate 5, on which the fuel asssmblies come to rest.

The vessel 1 has a rounded bottom 1a of hemispherical shape, in which the lead-through sleeves, such as the sleeve 7 shown in FIG. 1, are fastened in a sealed manner.

It should be noted that the representation of FIG. 1 is highly diagrammatic and is far from being true to reality. In particular, the diameter of the sleeves 7 or lead-throughs has been enlarged considerably in relation to the dimensions of the vessel, in order to illustrate the elements to which the process according to the invention relates.

In actual fact, fifty lead-throughs 7, the inside diameter of which is substantially equal to 15 mm, pass through the bottom 1a of the vessel. The sleeve 7 forms the end leading through the vessel bottom 1a of an instrumentation tube 6 of great length, connecting the instrumentation room 10 to the vessel bottom 1a. The instrumentation room 10 is arranged inside the reactor building in a lateral position relative to the pool 3. A vertical shaft 11 and a horizontal tunnel 12 make it possible to connect the instrumentation room 10 to the bottom of the vessel well 2. The instrumentation tubes 6 follow an L-shaped or U-shaped path within the well 11, the tunnel 12 and the vessel well 2, with the result that each of the instrumentation tubes 6 forms two bends 6a and 6b of relatively large radius of curvature. A glove finger 14, in which the neutron-flux measuring probes can be moved, is arranged inside the tube 6, in such a way that it can move in this guide tube 6 by being pulled or pushed at its end location in the instrumentation room 10.

The end of the sleeve 7 entering the vessel 1 engages into the lower end, or inlet end, of a guide conduit 8 passing through the inner equipment 4 of the reactor, up to the upper face of the core support plate 5. The guide conduit 8 opens onto this upper face of the support plate 5, for example by means of a guide endpiece which forms its outlet end and which is made to correspond to the lower end of an instrumentation tube of a fuel assembly during the fuelling of the core. The glove finger 14 is thus guided along its entire path between the instrumentation room 10 and the reactor core.

During their movement, the glove fingers 14 risk carrying radioactive particles coming from the core with them inside the guide tube 6. These particles 15 tend to collect together and settle in the zones of the bends 6a and 6b and in the straight horizontal part of the guide tube 6 located between the bends 6a and 6b. The accumulations of particles 15 considerably increase the pulling or pushing forces necessary to ensure the movement of the glove finger 14.

It is therefore necessary, during the periods of maintenance of the nuclear reactor, to carry out the cleaning of the tubes 6 in order to eliminate the accumulations of particles 15.

Figure 2:
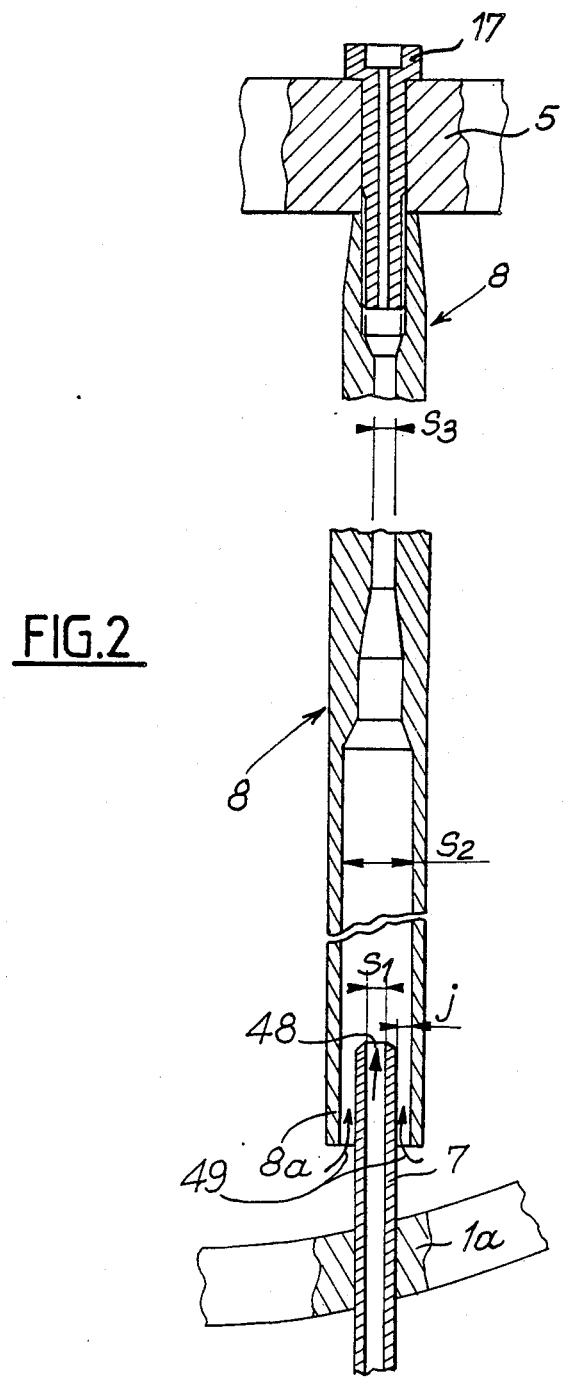
FIG. 2 is a vertical section view of a guide conduit passing through the lower internal equipment of the reactor.

Referring to FIG. 2, this shows in more detail the structure of a guide conduit 8 passing through the lower internal equipment 4 of the reactor, up to the upper face of the core support plate 5.

It will be seen that the guide tube 8 comprises several successive parts, the diameter of which decreases from the inlet end of the guide conduit located in its lower part up to its outlet part located just above the support plate 5. The sleeve 7 penetrates over a certain length into the inlet end 8a of the conduit 8 with a relatively large radial play J. This radial play makes it possible to install the lower internal equipment more easily inside the vessel 1 of the reactor, this operation making it necessary to match the fifty ends 8a of the guide conduits to the fifty corresponding sleeves 7 fastened in the vessel bottom 1a.

The guide conduit 8 terminates, level with the core support plate 5, in an endpiece 17 which is intended, during the fuelling of the core, to coincide with an instrumentation tube of a fuel assembly.

Referring once again to FIG. 1, the device used for cleaning the instrumentation tube 6, in order to eliminate the accumulations of particles 15 which may be present in these tubes, will now be described.

The device which will be descried is placed in successive positions allowing it to carry out the cleaning of each of the instrumentation tubes 6 in succession.

The ends of the tubes 6 opening into the instrumentation room 10 are fastened to a horizontal plate 19 located at a level higher than the level of the reactor vessel 1. Each of the tubes 6 is fixed, at its end, to a housing 20 equipped with gaskets making it possible to ensure the passage and movement of the glove finger 14, while at the same time keeping the housing 20 sealed. The housing 20 is likewise connected to an injection pipe 21 which can be fed with demineralized water under pressure by means of a pump 22 and a feed pipe 23.

Each of the instrumentation tubes 6 has a sealed injection housing, such as the housing 20, connected to the pump 22 by means of an injection pipe 21.

In FIG. 1, the vessel of the nuclear reactor has been shown in its position making it possible to service the reactor and, in particular, clean the instrumentation tubes. The vessel is open, the fuel assemblies of the core have been extracted and the vessel and pool 3 are filled with water, the sealing housings 20 being fitted on the ends of the instrumentation tubes 6 before the pool is filled.

Before the core assemblies are extracted, the glove fingers are put in their extracted position, the end of the glove finger located inside the room 10 having a length in the vicinity of 6.50 m. The glove finger is thus extracted completely from the core and from the lower internal equipment 4 kept in place in the vessel 1.

The cleaning device making it possible to carry out the process according to the invention comprises a vertical pole 25 of great length, suspended on the end of a hoist 26 mounted so as to travel on a running track 29 by means of a carriage 27. The running track 29 formed by rails is itself carried by a platform 30 travelling on rails 31 fastened to the edges of the pool 3.

The elements 26, 27, 29, 30 and 31 form part of the reactor fuelling apparatus.

This device makes it possible to install the pole 25 vertically in line with each of the guide conduits 8 of the lower internal equipment 4 in succession. The pole 25 carries, at its end, a ballast 33, under which is fastened a bell 34 equipped with a gasket 35 which will be described in more detail with reference to FIGS. 3a, 3b and 3c.

A pump 36 is connected to the inner volume of the bell 34 by means of a suction pipe 36a. The delivery outlet of the pump is connected, by means of a flexible conduit 37, to the inlet of a filter 38, the outlet of which communicates with an effluent discharge circuit 39. The circuit 39 can be either the circuit for discharging the effluent from the nuclear reactor or the circuit for filtering the water of the pool. In the latter case, after a second filtration the purified effluent is conveyed to the pool 3.

To make it possible to install the pole 25 and the bell 34 in a desired position on the upper face of the core support plate 5, a video camera 40 and a spotlight 41 which allow the remote monitoring of the installation of the bell 34 are used.

FIGS. 3a, 3b and 3c illustrate three different embodiments of the end, opening onto the upper face of the core support plate 5, of the instrumentation guide conduit 8.

In FIG. 3a, the conduit opens out directly via a duct passing through the plate 5. The end of the conduit 8 is fastened to the plate 5 by means of screws 44.

In FIG. 3b, which corresponds to the embodiment also shown in FIG. 2, the conduit 8 terminates in an endpiece 17 fastened in a bore passing through the core support plate 5.

In FIG. 3c, the conduit 8 terminates in an endpiece 45 consisting of several parts and fastened in a large-diameter bore in the core support plate 5.

The bell 34 of the cleaning device, incorporating the gasket 35, is matched to the shape of the end of the guide conduit 8.

In all cases, this bell 34 consists of a stage, in which there is a recess 46 surrounded by the gasket 35. The bell 34 is integral with at least two centering and positioning studs, such as the stud 42, which are centered in holes 43 in the plate 5 and, in general terms, in holes for the passage of the cooling water of the reactor.

The end of the pipe 36a is fastened to the bell 34 so as to open into the chamber delimited by the recess 46, the gasket 35 and the core support plate 5, when the device is in the operating position, as shown in FIGS. 3a, 3b and 3c.

To carry out the cleaning of a tube 6, the bell 34 is installed on the core support plate 5 above the end of the guide conduit 8 corresponding to the tube 6 to be cleaned.

The pole 25 is used for this purpose and is brought vertically in line with the guide conduit 8 by means of the gantray 30, the carriage 27 and the hoist 26.

The position fingers 42 of the bell 34 are introduced into water passage holes 43 which ensure the positioning and centering of the bell 34. The pole is lowered up to the moment when the gasket 35 comes to rest on the upper face of the support plate 5. The ballast 33 fastened to the end of the pole makes it possible to exert a certain pressure on the gasket 35.

The positioning of the bell 34, to which the suction device 36, 36a is connected, is ensured and monitored by means of the video camera 40 and the spotlight 41.

The actual cleaning operation can then begin. This operation is carried out by conveying a flow of demineralized water Q1 into the tube 6, this flow being injected into the housing 20 by means of the pump 22 and the injection pipe 21. The flow rate Q1 is set at a value sufficient to ensure that the circulation of water in the tube 6 carries with it the radioactive particles 15 which have accumulated in the tube and which are subsequently transported to the outlet of the sleeve 7, within the inlet end 8a of the guide conduit 8.

At the same time as the injection of demineralized water into the tube 6, the pump 36 is started up at a suction rate Q2 higher than Q1 and fixed so that the radioactive particles arriving at the end of the sleeve 7 together with the demineralized cleaning water are sucked up reliably by the suction unit 36, 36a.

Referring to FIG. 2, it will be seen that the inner cross-section S1 of the sleeve 7 is substantially less than the cross-section S2 of the inlet end 8a of the guide conduit 8. The radioactive particles carried along by the cleaning water and arriving at the end of the sleeve 7 therefore risk falling back onto the vessel bottom.

A suction rate Q2 which is such that the ratio Q2/Q1 is substantially equal to or higher than the ratio S2/S1 is therefore set. The speed V2 in the end part 8a of the guide conduit 8 is thus substantially equal to or higher than the speed V1 of the cleaning water, in which the radioactive particles are carried along. The cleaning stream is consequently driven upwards in the guide conduit, and the radioactive particles cannot fall back onto the vessel bottom. A suction rate Q2−Q1 prevails on the vessel bottom, with the result that no circulation of liquid can take place in the downward direction.

In FIG. 2, the stream for cleaning the tube is represented by the arrow 48 and the stream of water sucked up on the vessel bottom is represented by the arrows 49.

In respect of a sleeve having an inner cross-section, the diameter of which is 15 mm, and a guide conduit, the inlet cross-section of which has a diameter of 70 mm, the value of the ratio S2/S1 is:

38.5/1.76≈22.

To ensure that the interior of the guide tube is swept sufficiently to carry along the radioactive particles, it was necessary to set a circulation speed V1 of the demineralized cleaning water of 0.3 m/s. In this case, the rate Q1 is 0.19 m³/h and the rate Q2 is therefore:

Q2=22×0.19=4 m³/h.

If these injection and suction rates are used respectively, cleaning is carried out, with suction of all the particles carried along by the cleaning fluid. The particles suspended in the cleaning water and in the water sucked up on the vessel bottom arrive at the chamber which is delimited by the bell 34 and the core support plate 5 and into which opens the pipe 36a. The particles are substantially driven into the pipe 36a by means of the pump 36 and then delivered into the conduit 37, up to the filter 38 where most of these particles are trapped. The fluid sucked up and, as the case may be, a small residue of particles, are subsequently conveyed into the circuit 39, where they form effluent. If appropriate, after a second filtration this effluent is returned to the pool 3.

The sealing of the bell 34 is effected, on the one hand, as a result of the weight of the ballast 33 and, on the other hand, because of the pressure difference on either side of the bell 34. In fact, the bell 34 is subjected to the pressure of the water filling the pool and the vessel on its outer surface, and the inner chamber of this bell, into which opens the pipe 36a, is subjected to the vacuum generated by the pump. This results in a bearing pressure on the bell and a compression of the gasket 35 which ensure effective sealing on the upper surface of the support plate 5 round the outlet end of the conduit 8.

At the end of the cleaning operation, its effectiveness can be assessed in two different ways:

the force required to insert the glove fingers can be measured before and after cleaning, and it is thus possible to monitor the effectiveness of the cleaning operation directly, the quantity of particles recovered by the filter 38 can also be evaluated by measuring the activity or mass of these particles or by conducting a visual examination; an indirect measure of the effectiveness of the cleaning operation is obtained in this way.

The advantage of the cleaning process according to the invention is that it can be used without the need to extract the lower internal equipment from the reactor vessel. This results in a time saving over the cleaning operation as a whole, risks of damage to the internal equipment during handling are avoided, and the doses of radioactivity received by the personnel carrying out the maintenance of the reactor during the handling of the lower internal equipment are reduced. The dose of radioactivity receiving during this handling is of the order of 1 Rem/h at the pool edge.

On the other hand, the process according to the invention can be carried out without using a complex suction device, such as that described in the abovementioned French Patent Application No. 2,573,236. The apparatus used is simpler and less costly and can be put into effect more quickly. The total cleaning time required is therefore much shorter.

On the other hand, the process according to the invention makes it possible to recover perfectly all the radioactive particles carried along by the cleaning water.

The process and device according to the invention are not limited to the embodiments which have been described.

Thus, a cleaning process carried out after the complete unloading of the core was as described above, but it is likewise possible to carry out this cleaning during only partial unloading, as a result of only a very limited modification to the device used.

For example, the pole 25 can be provided with a fairing having the outer bulk of a fuel assembly of the reactor, this fairing containing the bell, the pump and the flexible suction and delivery pipes connected to the pump. Since all the means used for suction are contained in a fairing having the bulk of a fuel assembly, it becomes easier to position this fairing in the core, even if the reactor is only partially unloaded. This avoids the risk of catching on the fuel assemblies or adjacent cleaning devices, if the fairing containing the suction means is lowered in the operating position onto the core support plate.

The pole 25 can also be replaced by a dummy fuel assembly which is handled by means of the mast of the reactor fuelling machine. As before, this dummy fuel assembly contains the suction unit comprising the bell, the pump and the suction pipes.

The invention can be used in any type of nuclear reactor containing instrumentation tubes opening into conduits passing through the core support plate, whatever the radial assembly play between the end of the instrumentation tube and the guide conduit.

What is claimed is:

1. Process for cleaning a guide tube (6) for a means (14) of measuring the neutron flux in a pressurized-water reactor at shutdown said reactor comprising a vessel (1) containing internal equipment (4, 5) for supporting and retaining fuel assemblies of a core of said reactor, arranged above a rounded bottom (1a) of said vessel and comprising a horizontal core support plate (5), a pool (3) communicating with an inner volume of said vessel (1), said vessel and said pool being filled with water, a building containing said pool (3) and said vessel (1) within a vessel well (2), and an instrumentation room (10) arranged laterally relative to said vessel well (2) and into which penetrates one of the ends of each of a plurality of guide tubes (6) which, over a path including at least one bend (6a, 6b), connect said instrumentation room (10) to said inner volume of said vessel (1), into which the guide tube (6) opens via a vertical sleeve (7) leading through said bottom (1a) and engaged with a certain radial play into an inlet end (8a) of a guide conduit (8) of the measuring means (14), formed in the lower internal equipment (4) and opening onto the upper face of the core support plate (5), level with an entry position of the means of measuring the flux in a fuel assembly, said process involving injection water into the guide tube (6) from the instrumentation room (10) and generating suction within the guide conduit (8) of the measuring means (14), wherein the suction is generated in the guide conduit (8) from the outlet end of said guide conduit (8) located level with the upper face of the core support plate (5), with a suction rate Q2 higher than the injection rate Q1.

2. Process according to claim 1, wherein the ratio of the suction rate Q2 to the injection rate Q1 is substantially equal to or higher than the ratio between the inlet cross-section (8a) of the guide conduit (8), into which the lead-through sleeve (7) engages, and the inner cross-section of the sleeve (7).

3. Process according to claim 1, wherein the water sucked up inside the guide conduit (8) is subsequently filtered in order to retain the suspended radioactive particles coming from the guide tube (6).

4. Process according to claim 3, wherein the filtered water is subsequently conveyed into a circuit (39) for discharging the effluent from the nuclear reactor.

5. Process according to claim 3, wherein the filtered water is subsequently returned into the pool (3) of the nuclear reactor.

* * * * *